United States Patent [19]

Burnsweig, Jr. et al.

[11] 3,766,551

[45] Oct. 16, 1973

[54] HIGH POWER, BROAD BANDWIDTH MODULATOR OF RF ENERGY

[75] Inventors: Joseph Burnsweig, Jr., Los Angeles, Calif.; Robert C. Heimiller, Plymouth, Mich.

[73] Assignee: Hughes Aircraft Company, Culver City, Calif.

[22] Filed: Sept. 22, 1965

[21] Appl. No.: 489,118

[52] U.S. Cl. .................... 343/5 DP, 325/38, 325/43, 332/29 R

[51] Int. Cl. .............................................. G01s 9/02

[58] Field of Search .................. 343/5 DP, 17.2 PC; 325/38, 43; 332/16, 29, 29 M; 333/11, 98 S

[56] References Cited

UNITED STATES PATENTS

| | | | |
|---|---|---|---|
| 3,095,543 | 6/1963 | McColl | 332/29 X |
| 3,131,363 | 4/1964 | Landee et al. | 325/38 X |
| 3,235,820 | 2/1966 | Munushian et al. | 333/11 X |

*Primary Examiner*—Benjamin A. Borchelt
*Assistant Examiner*—Richard E. Berger
*Attorney*—W. H. MacAllister and Walter J. Adam

[57] ABSTRACT

A high-level RF binary phase code modulating system wherein intelligence is impressed upon high power level RF energy by a predetermined binary code being generated by a code generator which determines the condition of a multipactor located in a path of RF energy passing through a waveguide junction. By permitting energy to pass through the multipactor and reflect either from a short or from the multipactor input port, as determined by the code, phase shifts are impressed upon the carrier signal.

9 Claims, 10 Drawing Figures

INVENTORS.
JOSEPH BURNSWEIG, JR.,
ROBERT C. HEIMILLER,
BY J.K. Haskell
ATTORNEY.

INVENTORS.
JOSEPH BURNSWEIG, JR.,
ROBERT C. HEIMILLER,
BY J. K. Haskell
ATTORNEY.

INVENTORS.
JOSEPH BURNSWEIG, JR.,
ROBERT C. HEIMILLER.
BY J. K. Haskell
ATTORNEY

HIGH POWER, BROAD BANDWIDTH MODULATOR OF RF ENERGY

This invention relates to modulators and more particularly to a modulating system which obtains wide bandwidth at high power level RF operation by rapid modulating between the RF energy source device and the radiating structure.

Intelligence, such as coded signals, is impressed upon transmitted signals by the process of modulation. The modulating process in conventional use operates directly on the RF source device of the system.

In radar and communications systems, the amount of intelligence or messages brought about by modulation is of great importance to the success of the system. The amount of intelligence is directly related to the bandwidth of the RF power source device of the transmitter. It is also highly desirable in these systems to cover a large distance, thus it is important that the RF source be capable of generating an output signal with a large amount of power. In radar systems narrow pulse widths determine range resolution capability. Ideally, the RF source of a transmitter should have the desirable characteristics of high power output to achieve long range, and have a broad bandwidth to carry a large amount of intelligence.

RF power sources, also referred to as power output devices, are at the key stage of transmitters, because the quality of the transmitted signals is determined by the characteristics of these sources.

In contemporary practice, power output devices for the transmitter are selected on the basis of the most desirable characteristic of the device, either high power is subordinated to wide bandwidth or vice versa.

As an example, oscillator type power output devices, such as magnetrons, may be employed in a radar transmitter. These oscillator-type power output devices are primarily designed for high peak power and a stable frequency operation, which results in a limited narrow bandwidth. Non-coherent systems, referring to use of amplitude modulated signals, normally employ an oscillator-type power output device.

A magnetron, though possessing relatively stable frequency outputs has an additional characteristic of random starting phases from output pulse-to-pulse at constant amplitude. Because of this characteristic, they are not compatible with a coherent system. Such is distinctly true in a coherent radar system. To achieve coherency in the operation of such an oscillator-type device, it is necessary to use some form of RF or IF pulse "locking" by sampling the transmitted signal. Methods of obtaining coherency are described by L. N. Ridenour, "Radar Systems Engineering," MIT Radiation Laboratory Series, Volume 1, chapter 16. These methods require complex added circuitry to the system, and the resultant system while workable remains limited by the peak-power and narrow band of the magnetron.

As a further example, amplifier type power output devices, such as klystrons and travelling-wave tubes, have high power outputs, but as higher bandwidth amplification operation is required, time delay distortions are introduced into the output signal. Therefore, bandwidth in these amplifier-type power output devices is limited to the small signal linear amplification region of the amplifier. Coherent systems, referring to preservation of phase reference between the transmitted signal and received signals, normally employ an amplifier-type power output device in the transmitter because of pulse-to-pulse phase problems encountered with oscillator-type devices.

Another problem frequently encountered with broad-band RF energy, is the feed line energy losses and frequency dispersion naturally brought about by the distance between the power output device and the radiating antenna. Physical limitations on the location of the power output devices introduce energy losses because of length of transmission line between the device and the antenna.

In contemporary practice, modulation of the RF outputs of transmitter power output devices takes place in the stage of the transmitter prior to the power output device. In view of the prior discussion of power output devices, it is apparent that the amount of intelligence impressed by modulation on the RF transmission is limited to the compromised linear gain bandwidth operational characteristics of the power output device.

Peak-power output problems, associated with power output devices which limit the transmission range, have been partly reduced in both radar and communications transmitters by use of pulse compression techniques. Pulse compression has been described in S. Darlington, U.S. Pat. No. 2,678,997, R. H. Dicke, U.S. Pat. No. 2,624,878 and in an article by C. E. Cook. Proceedings of IRE, Vol. 48, pp. 310–316 of March, 1960.

Non-coherent data processing radar systems utilize frequency modulation pulse compression techniques and analog coding on the carrier of the transmitted signal to obtain good range resolution. Analog coding, as used in this application refers to the varying of transmission with time. Employment of pulse compression necessitates transmitting long coded pulses to obtain a high average power, and broad bandwidth for improved range resolution. Therefore, the amount of pulse compression is limited to the time-bandwidth occupied by the transmitted waveform, and the bandwidth limit is a characteristic of the power output device used.

Coherent data processing radar systems utilizing phase-modulated pulse compression, code the inputs to power output device, dividing the transmitted output waveform into a finite number of intervals. The number of intervals is directly related to the required bandwidth of the compressed pulse, and the accuracy and range measurement for which the system is designed. Each interval is transmitted unchanged in phase or shifted 180° in phase, establishing a digital binary (0 or 1) code. Digital coding, as used in this application, refers to the time-periods of transmission; polyphase coding intervals of less than 180° may be employed as in tertiary, octal, etc. Tapped delay lines may be inserted at the amplifier-type power output device to establish the phase shifts. The narrower the divided interval the greater the range resolution, and the broader the bandwidth the greater the accuracy. In either the analog-coded frequency-modulated or the digital-coded phase-modulated pulse compression systems, the discontinuity rate (i.e., number of coded intervals per unit of time) will determine the amount of intelligence which can be impressed on the transmitted signals.

Whether the power source device is coherent, non-coherent, tunable, and/or coded, the basic limitation remains with the device's characteristics, because the modulator of the device is inter-related to the device's own limits of bandwidth and power output.

Even if broadband RF energy, though limited, is obtained from the power output device, feed line energy losses and frequency dispersion occurs prior to the radiating structure.

The present invention presents a unique solution to the limited bandwidth, power output, and line loss problems encountered by the modulation of the power output device. This invention modulates the RF output signal from the power output device instead of the device itself, permitting a code to be placed in the carrier without distortion, permits coherent coding of an incoherent carrier of a non-coherent device, is capable of modulation switching in the order of nanoseconds, permitting more accurate range resolution in radar applications, effectively handles the high power outputs of the power output devices, and may be employed physically close to the radiating structure.

Accordingly, it is an object of the present invention to provide a novel modulating system for RF energy.

Another object of the present invention is to provide an extremely rapid modulating system for RF transmissions.

A further object of the present invention is to provide a high level power handling modulating system for RF energy.

In addition, an object of the present invention is to permit use of a pulse-to-pulse non-coherent power output device as a carrier of coherent coding.

Another object of the present invention is the provision of a novel RF modulating system in which the bandwidth and power output limitations on power modulating output devices is substantially reduced.

Another significant and novel object of the present invention is to provide a simple coder for data processing radar and communication systems.

Still a further object of the present invention is to employ a high power level modulator which allows placement physically close to the radiating structure, to substantially eliminate frequency dispersion and feed line losses which occur during broadband energy transit to the radiating structure.

Briefly, the present invention provides wide bandwidth modulation of high power level RF transmissions. The present invention according to one embodiment comprises a combination of devices including a code generator, pulse generator, and a non-reciprocal waveguide device which includes a high speed switching device. Switching devices usable in the present invention may be multipactors, gas discharge tubes, gated gas discharge tubes, or equivalent. RF energy from a high power output tube enters the waveguide device and will either pass through the switching device or reflect therefrom. The code generator, having a predetermined code design of high or low states generates a coded signal to operate the pulse generator. This code is generated synchronously with the operation of the power output device. When the coded signal is generated, it is applied to a pulse generator whose output voltage inhibits the switching action, thus permitting the switching device to be either "on" or "off," depending upon the code generated. If a multipactor is used, the multipactor is "on" in the absence of inhibiting (quenching) voltage applied to the multipactor, then RF energy reflects from the multipactor. When the multipactor is turned "off," quenching voltage is applied to the multipactor and RF energy passes through the multipactor and reflects from a reflective short in the waveguide device. The reflected RF energy, whether from the multipactor or from the waveguide device short then passes to an antenna to be transmitted and is sampled by a receiver. Since the RF energy to the antenna has taken a longer or shorter path, causing a phase shift, during a preselected time interval in its transit to the antenna, the RF carrier has in effect been "fingerprinted" so that it may be easily identified or decoded when received.

The above and other features, objectives and advantages of the present invention will appear from the following description of exemplary embodiments thereof illustrated in the accompanying drawings wherein like reference characters refer to like parts and wherein.

Figure 5:
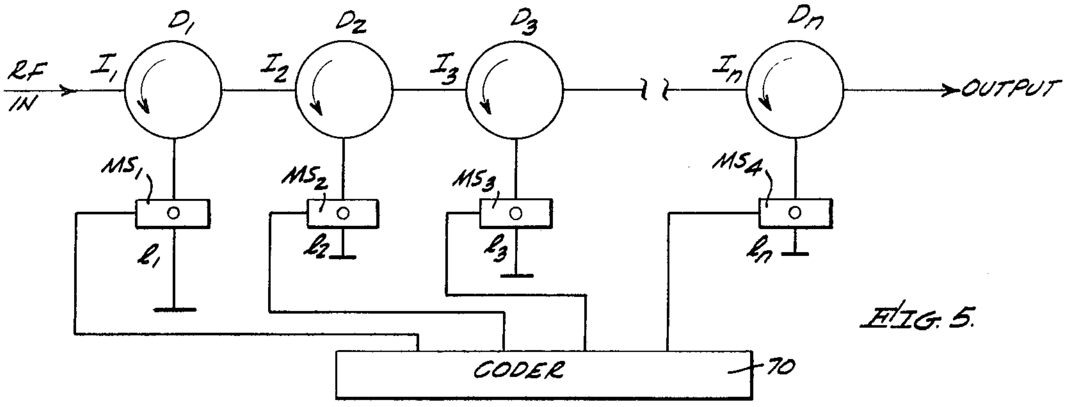
Figure 5A:
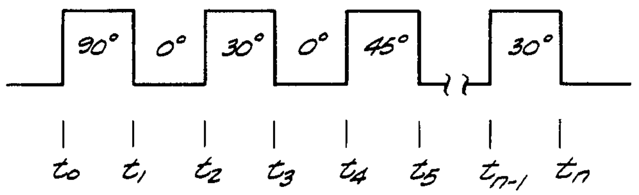

FIGS. 4*a* through 4*e* illustrates the relationship of coding, switching action and the output signal of the power output device;

FIG. 5 is a schematic diagram illustrating multiplicity of waveguide devices and multipactors for polyphase coding of RF; and FIG. 5*a* is a graph which illustrates a poly-phase coding sequence with phase-shift and code intervals.

Figure 1:
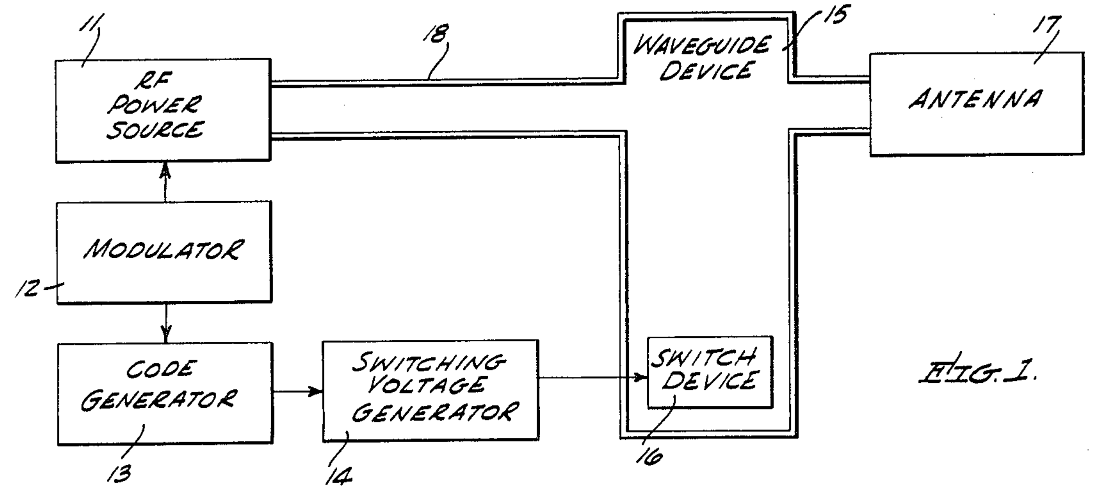
FIG. 1 is a block diagram broadly illustrating a high level RF modulator embodying the principles of this invention.

In FIG. 1 there is shown a high power output device 11 which may be a magnetron, traveling wave tube, klystron, backward wave oscillator or similar device directly connected to a non-reciprocal waveguide device 15 by the transmission line 18. Non-reciprocal waveguide devices suitable for use in the present invention, but not necessarily limited thereto, include three-port circulators, four-port circulators, hybrids, and their equivalents. The transmission line may be only the length of the connecting port arm of the waveguide device or a separate length between the power output device and the non-reciprocal device. A modulator 12 drives the high power output device and the modulator drive signal synchronizes the code generator 13. The output signal of the code generator drives a switching voltage generator 14 which generates a signal voltage to inhibit operation of switching device 16.

Figure 2:
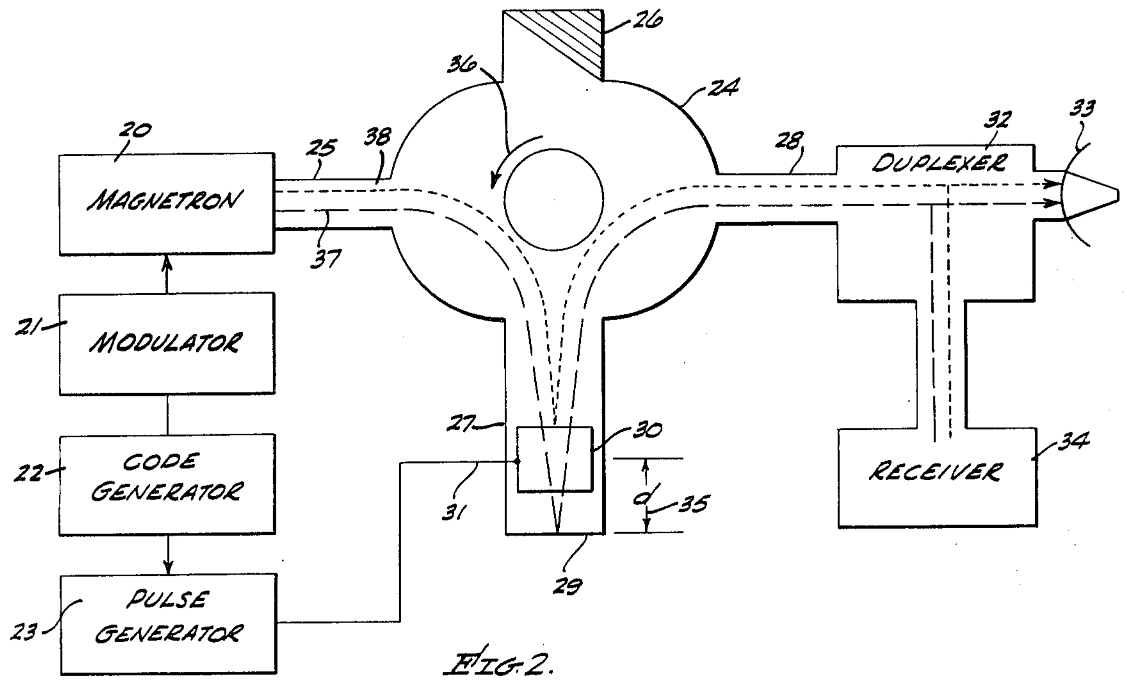
FIG. 2 is a schematic diagram of the present invention where a magnetron is the power output device.

In FIG. 2 there is shown a magnetron 20 being driven by a modulator 21 and a code generator 22 connected to the modulator to sample the modulator drive signal. Code generator 22 generates a binary code which may be of any length. As an example, a code of "three" may consist of + − − + wherein the + refers to a "one" or high state and a minus corresponds to a "zero" or low state. These states exist during a predetermined time interval, called a "bit." Bit time intervals may be in microseconds, tenths of a microsecond or in nanoseconds. A longer code such as a code of five may be + + + − +, etcetera. Thus, the code generator 22 will have a coded output signal predetermined by the code length which will in turn cause a pulse generator 23 to generate a high voltage quenching signal which is coupled to a multipactor device 30 via connector 31. The pulse generator 23 may be a hard-tube pulser, line-type pulser, or a distributive amplifier. These pulse generators are well known in the art and are described in Volume 5 of "Radiation Laboratory Series," published by McGraw-Hill.

A shift in phase of the RF carrier from the magnetron is introduced by positioning the multipactor a distance "*d*" from a short 29. The combination of code, multipactor switching, and the introduction of a phase shift produces a "phase shift code" on the RF carrier.

In pulse compression usage, codes which may be used are the Barker Codes described in "Group Synchronizing of Binary Digital Systems" by R. H. Barker, and "Communications Theory," Academic Press, London 1953; also usable are the codes of De Long as described in "Experimental Autocorrelation of Binary Codes," by D. F. De Long, MIT, Lincoln Labs Report, No. 47G0006, of Oct. 24, 1960.

The switching time in the order of a few nanoseconds of a multipactor is equivalent to an RF cycle, at certain frequencies. It is pointed out that the pulse rise time of a driving pulse generator to the multipactor does not directly determine the switching time of the multipactor, since the multipactor switching time is operating in a regenerative mode. Voltages of the order of hundreds or kilovolts may be required from the pulse generator, depending on the multipactor characteristics. The quenching voltage applied to the multipactor inhibits electron multiplication (multipaction). When quenching voltage is removed, multipaction occurs. Thus, the quenching voltage inhibits the secondary electron multiplication.

When the RF output of the magnetron enters an entry port 25 of the waveguide four-port circulator device 24, havig a matched load 26 and the short 29, the path of RF energy indicated by directional arrow 36 will be either a reflected wave path 37 or a multipacted wave path 38. The multipactor device 30 is positioned in the circulator at a distance "*d*" from the short 29. The distance d is a function of wavelength depending upon the amount of phase shift to be imparted to the RF signal passing through the multipactor 30 over a coded interval. If $d$ is made to equal $(n/2 + 1/4)\ \lambda g$, where $\lambda g$ is the waveguide wavelength, (plus a correction for the multipactor tube reactance component) then the phase change will be $2\pi n - \pi$ radians which is an effective phase shift of 180°. If the multipactor 30 is in an "ON" condition (no quenching voltage applied) then the incoming RF will pass through the multipactor striking the short 29 and be reflected back through the multipactor and out exit port 28 to antenna 33. No phase shift occurs while the multipactor is ON. But if an inhibiting voltage is applied to the multipactor 30 from pulse generator 23, the RF energy is phase-shifted 180°, shown by reflected path 38 during the coded interval.

Figure 3:
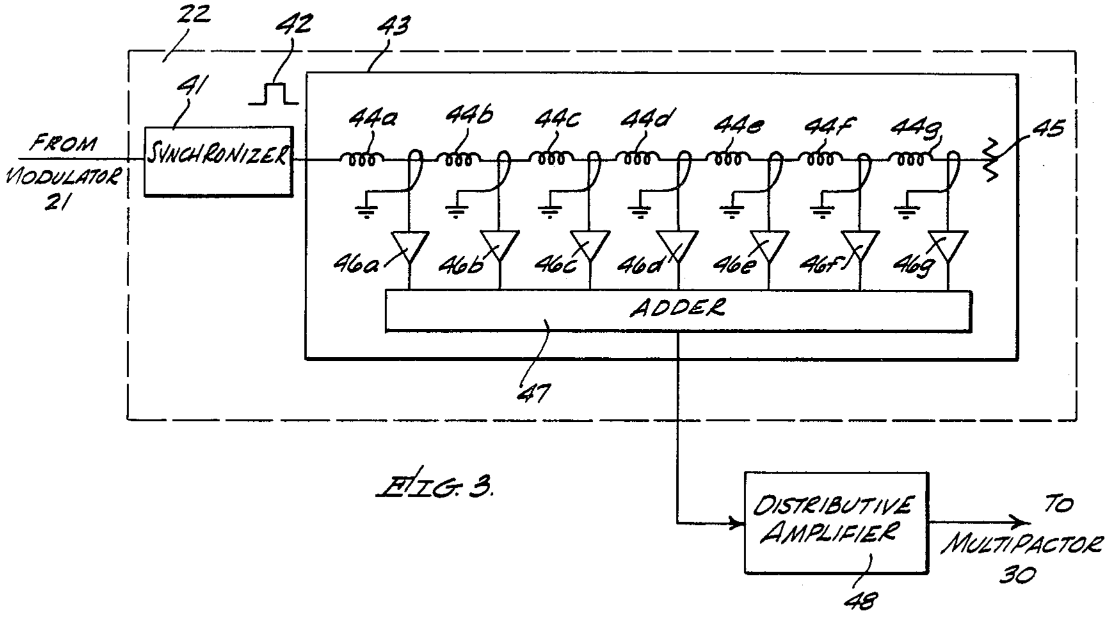
FIG. 3 is a schematic diagram illustrating the development of pulse coding for multipactor switching.

FIG. 3 is a schematic diagram of a code generator 22 used in, but not limited to, the present invention. To develop a pulse code for multipactor switching, synchronizer 41 provides synchronous timing between the magnetron modulator 21 and the code generator 22 by generating timing pulse 42 which enters a delay line 43. Delay line 43, has multiple taps, each tap corresponding to a delay bit time or multiple bit times. Bit-delay pickoff points 44*a* through 44*g* are preselected on the basis of the bit delay interval desired. Amplifiers 46*a* through 46*g* provide sufficient amplification levels of the delayed pulses to drive a distributive amplifier 48 after the pulses are first processed through a summer or adder 47. Amplifiers 46*a* through 46*g* and the adder 47 are well known in the art, as well as a distributive amplifier 48. The distributive amplifier 48 generates the high voltage switching pulses required according to the code determined by the coder to turn off the multipactor 30.

Figures 4A, 4B, 4C, 4D, 4E:
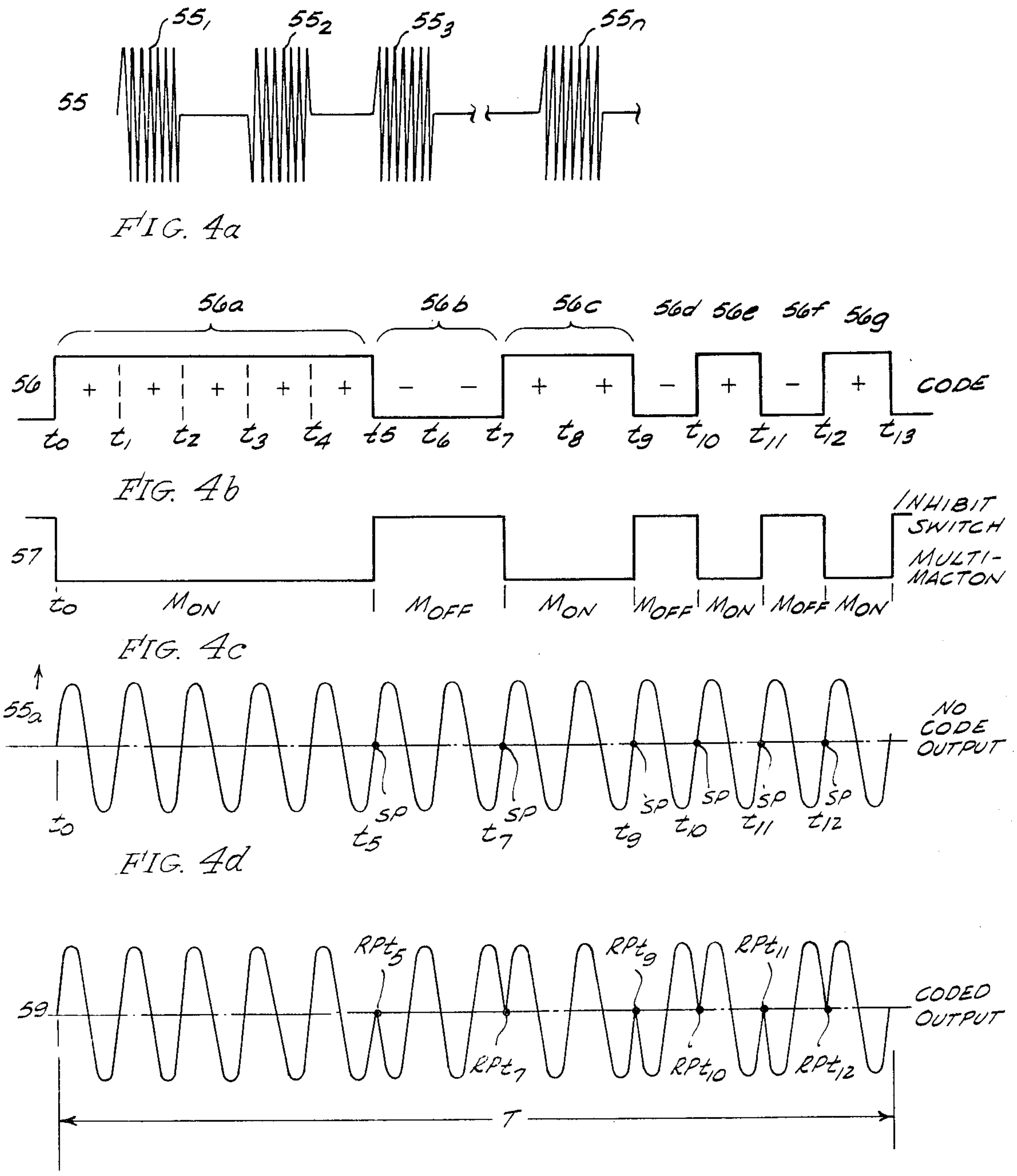

Turning now to FIGS. 4*a*–4*e*, there is shown a series of waveforms, where FIG. 4*a* shows waveform 55 which represents RF pulses from the magnetron, each pulse having width of time T. Waveform 55 is shown in expanded and uncoded form at 55*a* as shown in FIG. 4*d*. Waveform 56 shown in FIG. 4b illustrates a time waveform for a code of 13 over bit time intervals $t_0$ through $t_{13}$. The distribution of the code of 13 illustrated is 5+, 2−, 2+, −, +, −, and +. (+++++——++—+—+) Intervals 56*a* through 56*g* shown at waveform 56, together with bit-sign, are generated as a code by the corresponding delay coder 43 and amplifiers 46*a* through 46*g* shown in FIG. 3. Distributive amplifier 48 of FIG. 3 generates switch-quenching voltages during the periods shown as waveform 57 in FIG. 4*c* which switches multipactor 30 off. Symbolic notation $M_{on}$ indicates no quench voltage applied to multipactor and $M_{off}$ indicates application of quench voltage to the multipactor. Since multipactor switching time can be of the order of nanoseconds as previously discussed, the bit time interval can be of the order of a few RF cycles. For illustrative purposes, the equal bit time interval ($t_0$ to $t_1$, $t_1$ to $t_2$, etcetera), is selected to correspond to a single cycle of the RF carrier and the multipactor switch time is equivalent to a single cycle of the RF carrier. However, the switching time does not necessarily correspond to a single cycle of the RF energy carrier. For instance, if X-band energy was selected of frequency 10 Gc, then this corresponds to 10 cycles of X-band per nanosecond. If 5 Gc C-band energy were the carrier frequency, then 5 cycles occur in one nanosecond. Similarly, 1Gc L-band corresponds to one RF cycle in 1 nanosecond. Waveform 59 as shown in FIG. 4*c* illustrates binary phase code operation on the RF carrier.

During the coded interval shown as 56*a*, at waveform 56 in FIG. 4*b* no quench voltage is applied to the multipactor, indicated at waveform 57 ($M_{on}$), FIG. 4*c*, such that no change in the carrier phase occurs during the time interval $t_0$ through $t_5$. During the interval 56*b* ($t_5$ through $t_7$) multipactor quench voltage is applied for two bit intervals beginning at $t_5$ resulting in 180° phase reversal of the carrier during the two bit ($M_{off}$) interval. During the interval 56*c* ($t_7$ through $t_9$) no multipactor quench voltage is applied ($M_{on}$) so that during the interval $t_7$ through $t_9$ zero phase shift is experienced by the carrier during this interval. Subsequent quantized phase changes arising during the intervals 56*d* through 56*g* present similar phase changes corresponding to the application of inhibit voltage. The points designated as SP at waveform 55*a*, FIG. 4*a*, indicating switching points of time, correspond to the phase reversal points designated as RP at waveform 59, FIG. 4*e*.

The following table provides a tabulated explanation of the binary phase code and operations taking place as described in FIG. 4.

| Bit Time Interval | Apply Quench Voltage | Code | Phase Change | Multipactor Condition |
|---|---|---|---|---|
| $t_0$ to $t_5$ | NO | +++++ | 0° | ON |
| $t_5$ to $t_7$ | YES | —— | 180° | OFF |
| $t_7$ to $t_9$ | NO | ++ | 0° | ON |
| $t_9$ to $t_{10}$ | YES | − | 180° | OFF |
| $t_{10}$ to $t_{11}$ | NO | + | 0° | ON |
| $t_{11}$ to $t_{12}$ | YES | − | 180° | OFF |
| $t_{12}$ to $t_{13}$ | NO | + | 0° | ON |

These binary phase changes impressed upon the magnetron output pulse carrier effectively codes the noncoherent magnetron output during a pulsed interval. Since the output is coded on each transmitted pulse, and may be receiver sampled, the return signal is capable of pulse-to-pulse decoding. Sampling by a receiver could be achieved by conventional diplexing at the output port of a circulator. Such a feature makes the invention highly desirable in data processing type radars, and pulse compression systems. When such phase modulation is used for pulse compression, a compression filter is used in the receiver, and the filter is matched to the phase modulation program used. This filter may be mechanized with a tapped delay line, cascade filter, or parallel channel filter. For narrow pulse operation, as may be required for a radar system having long range and high resolution capability, the multipactor provides switching time in the order of nanoseconds, thus the interval coded is extremely narrow and suitable for short time intervals discrimination in data processing applications.

If a travelling wave tube is employed instead of a magnetron as the power output device, broad bandwidth coding operation is achieved without the time delay distortion normally caused by the inherent characteristics of such power output devices.

FIG. 5 illustrates another embodiment of the present invention utilizing a plurality of multipactors and a cascaded group of ferrite circulators to achieve polyphase coded or multiple phase-shifts of high-level RF. Of course, the other non-reciprocal devices previously mentioned may be used instead of circulators. Circulators $D_1$ through $D_n$ are shown as three port unidirectional devices, each having a respective one of multipactors $MS_1$ through $MS_n$ respectively, and terminating short circuit ports $1_1$ through $1_n$ respectively. The lengths of ports $1_1$ through $1_n$ are predetermined to set the amount of phase-shift to be impressed on the RF signal passing therethrough. Coder 70 is similar in operation to the code generator and switching voltage generator described in FIG. 3 except that it operates a multiple number of multipactor switches instead of a single multipactor switch.

An RF signal enters input port $I_1$ of circulator $D_1$ and is reflected by or passes through multipactor switch $MS_1$ depending upon the switching code. If $1_1$ is of preselected length to induce a round trip phase-shift during the coded interval, then with multipactor $MS_1$ in the "off" condition (quench voltage applied) the RF carrier will be phase-shifted 90° and pass through the output port $I_2$ which is also the input port of circulator $D_2$. Simlarly, if $1_2$ is chosen to induce a 30° phase-shift at circulator $D_2$, the $1_3$ is chosen of sufficient length to bring about a 45° phase-shift, then a multiple number of varying phase-shifts at preselected times is impressed on the carrier at the output port of the last circulator $D_n$. FIG. 5A illustrates a poly-phase coding sequence with the phase-shift and code intervals described. Thus, the passage of the RF carrier energy from one switch to the next switch results in sequential binary coding at the appropriate time interval, such that the sequence of bits (or digits) generated possess a contiguous and quantized grouping of various phases.

What is claimed is:

1. A modulating system for RF power output devices having a transmission line for carrying RF energy, comprising:
   - coding means synchronized with said power output device for generating an output signal having predetermined characteristics;
   - pulse generation means responsive to said coding means output signal for generating a pulsed signal during time intervals determined by characteristics of said coding means output signal;
   - non-reciprocal microwave means connected to said transmission line for carrying RF energy; and
   - multipactor means responsive to said pulsed signal and said RF energy, positioned at a terminal of said non-reciprocal microwave means for modulating said RF energy.

2. A modulator of RF energy from a high power output device, having a transmission line connected thereto for carrying RF energy, comprising:
   - a waveguide junction, said waveguide junction having a plurality of terminals and being connected to the transmission line for carrying the RF energy entering at a first terminal to the next adjacent terminal in a predetermined direction;
   - a signal generator for generating a control signal; and
   - a multipactor, said multipactor being positioned in the direction of the RF energy at a terminal of said waveguide junction and being responsive to the control signal of said signal generator for modulating the RF energy.

3. In a radar system having magnetron power output device emitting non-coherent output pulses of RF energy, a radiating device, and a transmission line for carrying RF energy from the magnetron to the radiating device, a RF modulator comprising:
   - coding means synchronized with the output pulses of said magnetron for generating an output signal having a predetermined sequence of coding pulses;
   - pulse generating means responsive to said coding pulses to generate quenching voltage pulses;
   - non-reciprocal multiport waveguide means coupled to said transmission line between said magnetron and said radiating device to divert the RF energy emitted by said magnetron; and
   - multipactor means, positioned near a reflective port of said waveguide means and at a predetermined wavelength-multiple distance from said reflective port, responsive to said quenching voltage pulses and said RF energy for impressing a coherent rendering phase code upon said output pulses.

4. In a radar system, having a power output device emitting an output signal of RF energy and a transmission line for carrying RF energy, a RF modulator comprising:
   - coding means synchronized with said output signal for generating a wavetrain of coding pulses, said coding pulses having a predetermined amplitude and time interval;
   - pulse generation means responsive to said wavetrain of coding pulses for generating quench voltage pulses during intervals determined by said coding pulses;
   - four-port circulator device coupled to said transmission line by a first Rf energy entry port, a second port having a reflective short, a third port having a matched impedance located therein, and a fourth port for RF energy exit; and multipactor means, responsive to said output signal of RF energy and said quenching voltage pulses and positioned at a multiple wavelength distance from said reflective short, for phase coding said output signal by permitting said output signal to reflect from said short during intervals when said quench voltage pulses are not applied and phase shifting said output signal during intervals when said quench voltage pulses are applied.

5. A RF modulator according to claim 2, wherein said multipactor means is positioned at one-quarter wavelength distance from said reflective short for binary phase coding of said RF output signal.

6. A modulating system for RF power output devices having a transmission line for carrying RF energy, comprising:

coding means synchronized with said power output device for generating an output signal having predetermined characteristics;

pulse generation means responsive to said coding means output signal for generating a pulsed signal during time intervals determined by characteristics of said coding means output signal;

non-reciprocal microwave means connected to said transmission line for carrying RF energy; and gaseous discharge tube means responsive to said pulsed signal and said RF energy, positioned at a terminal of said non-reciprocal microwave means for modulating said RF energy.

7. A modulating system for RF energy emitted by power output devices, comprising:

code generator means synchronized with said transmitter power output device to generate an output signal having predetermined characteristics;

pulse generation means responsive to said coding means output signal to generate a pulsed signal during time intervals determined by characteristics of said coding means output signal;

plurality of non-reciprocal waveguide means arranged in a cascade, each having a port with a reflective short for carrying RF energy emitted by said power output device; and switching means located at each of said cascaded waveguide means and positioned respectively at a predetermined distance from said port having a reflective short, responsive to said pulse generation means output pulses and said RF energy to impress poly-phase intelligence upon said RF energy.

8. A high speed modulator according to claim 7 wherein said switching means located within each of said cascaded non-reciprocal waveguide means comprises a multipactor.

9. In a radar system having a high power output tube modulated by a first modulator and a transmission line for carrying RF energy connected between the power output tube and an antenna, an improved high level RF modulator comprising:

synchronizing means responsive to said first modulator for generating synchronizing pulses determined by the time interval of operation of said power output device;

code generating means, having a delaying means for time delaying said synchronizing pulses and summing means responsive to said delaying means for summing said delayed pulses, for generating a wavetrain of pulses having a predetermined amplitude and pulse spacing during a predetermined time interval;

distributive amplifier means responsive to said wavetrain pulses for generating a sequence of inhibit voltage signals;

non-reciprocal waveguide device including a first port connected to said transmission line, a second port with a reflective short located therein, also including a third port connected to said antenna for transferring RF energy to said antenna; and multipactor device, located at a predetermined multiple wavelength distance from said reflective short, and responsive to impinging RF energy and said inhibit voltage signals for phase modulating said RF energy by permitting said RF energy to reflect from said reflective short during intervals when said inhibit voltage signal is not applied and reflecting said impinging RF energy during intervals when said inhibit signals are applied.

* * * * *